United States Patent [19]

McDonald

[11] 4,007,334

[45] Feb. 8, 1977

[54] TIME DIVISION DIGITAL LOCAL TELEPHONE OFFICE WITH TELEMETERING LINE UNIT

[75] Inventor: Henry Stanton McDonald, Summit, N.J.

[73] Assignee: Bell Telephone Laboratories, Incorporated, Murray Hill, N.J.

[22] Filed: July 2, 1975

[21] Appl. No.: 592,514

[52] U.S. Cl. .................. 179/15 AT; 179/15 BY
[51] Int. Cl.² ..................... H04J 3/02; H04J 3/12
[58] Field of Search ........ 179/15 BY, 15 AT, 84 T, 179/84 SS, 84 VF, 99, 17 E, 18 HB, 15 A

[56] References Cited

UNITED STATES PATENTS

| | | | |
|---|---|---|---|
| 2,547,549 | 4/1951 | Wennemer | 179/15 BY |
| 3,244,815 | 4/1966 | Anderson | 179/15 BY |
| 3,443,033 | 5/1969 | Louis | 179/15 BY |
| 3,492,435 | 1/1970 | Inose | 179/18 FC |
| 3,860,761 | 1/1975 | O'Neill | 179/15 AT |
| 3,875,339 | 4/1975 | Gruen | 179/15 BY |
| 3,922,495 | 11/1975 | Donohoe | 179/15 BY |

Primary Examiner—David L. Stewart
Attorney, Agent, or Firm—Charles Scott Phelan

[57] ABSTRACT

A line interface unit for a digital local office for telephonic communication has a circuit connected to telemeter low-frequency signals around a line, alternating current, hybrid coupler and reinsert the same signals in the call path at the input to an analog-to-digital encoder that is coupled to a time division switching network. Each interface unit also includes circuits for multiplexing various line unit, digital, status signals with coded call signals and for demultiplexing line unit, digital, control signals from coded call signals. That network is utilized by an office common control for interconnecting various call paths with one another and for interconnecting the common control with the line interface units as required. The common control includes a time-shared digital filter for processing the telemetered signals for various office purposes.

34 Claims, 8 Drawing Figures

FIG. 4A

OP CODES FOR ONE STATUS FRAME (eg 240 SAMPLE FRAMES)

ONE SAMPLE FRAME:

TYPICAL DATA TIME SLOT:
| Line | | | | | | | | | | |
|---|---|---|---|---|---|---|---|---|---|---|
| 1 | 24 | (16) | – | – | – | – | – | – | – | 24 |
| 2 | 24 | (16) | – | – | – |   |   | – | – | 24 |
| 3 | 24 | (16) | – | – |   |   |   |   | – | 24 |
| 4 | 24 | (16) | – |   |   |   |   |   |   | 24 |
| 5 | 24 | (16) |   |   |   |   |   |   |   | 24 |
| 6 | 24 | (16) |   |   |   |   |   |   |   | 24 |
| 7 | 24 | (16) |   |   |   |   |   |   |   | 24 |
| 8 | 24 | (16) | – | – |   |   |   | – | – | 24 |
| 9 | 24 | (16) | – | – | – | – | – | – | – | 24 |

SCAN TIME SLOT:
| Line | | | | | | | | | | |
|---|---|---|---|---|---|---|---|---|---|---|
| 1 | 25 | (17) | – | – | – | – | – | – | – | 25 |
| 2 | 26 | (18) | – | – | – |   |   | – | – | 26 |
| 3 | 27 | (19) | – |   |   |   |   |   | – | 27 |
| 4 | 28 | (20) |   |   |   |   |   |   |   | 28 |
| 5 | 29 | (21) |   |   |   |   |   |   |   | 29 |
| 6 | 30 | (22) |   |   |   |   |   |   |   | 30 |
| 7 | 31 | (23) |   |   |   |   |   |   |   | 31 |
| 8 | 31 | (23) | – | – |   |   |   | – | – | 31 |
| 9 | 31 | (23) | – | – | – | – | – | – | – | 31 |

LAST TIME SLOT:
| Line | | | | | | | | | | |
|---|---|---|---|---|---|---|---|---|---|---|
| 1 | 0 | – | – | – | – | – | – | – | – | 0 |
| 2 | 0 | – | – | – |   |   |   | – | – | 0 |
| 3 | 0 | – | – |   |   |   |   |   | – | 0 |
| 4 | 0 |   |   |   |   |   |   |   |   | 0 |
| 5 | 0 |   |   |   |   |   |   |   |   | 0 |
| 6 | 0 |   |   |   |   |   |   |   |   | 0 |
| 7 | 1 | – |   |   |   |   |   |   | – | 1 |
| 8 | 7 | – | – | – | – | – | – | – | – | 7 |
| 9 | 15 | – | – | – | 15 | 14 | 13 | 12 | 11 | 10 | 9 | 8 | 15 |

FIG. 4B

OPERATION CODES (IN DECIMAL) TO ALL LIUs IN FINAL TIME SLOT OF EACH SAMPLE FRAME

- 0 _____ (RESERVED)
- 1 _____ (INHIBIT COUNTER)
- 2 _____ (RESERVED)
- 3 _____ "
- 4 _____ "
- 5 _____ "
- 6 _____ "
- 7 _____ (INHIBIT COUNTER & LOAD)

- 8
- 9
- 10
- 11
- 12
- 13
- 14
- 15

CLAMP COUNTER AND SELECT PARTICULAR 9th BIT

OPERATION CODES (IN DECIMAL) (TO ALL LIUs) TO OPERATE AN ADDRESSED LIU

- 16 _____ DATA ON A RAIL
- 17 ⎫
- 18 ⎪
- 19 ⎪ SEND STATUS AND RECEIVE CONTROL FOR FOLLOWING BITS
- 20 ⎬
- 21 ⎪
- 22 ⎪
- 23 ⎭

- S1 & C1
  - S2 & C2
  - S3 & C3
  - S4 & C4
  - S5 & C5
  - S6 & C6
  - S7 & C7

- 24 _____ DATA ON B RAIL
- 25 ⎫
- 26 ⎪
- 27 ⎪
- 28 ⎬ (SAME AS 17-23)
- 29 ⎪
- 30 ⎪
- 31 ⎭

TIME DIVISION DIGITAL LOCAL TELEPHONE OFFICE WITH TELEMETERING LINE UNIT

BACKGROUND OF THE INVENTION

1. Field of the Invention

This invention relates to multiline telephonic communication systems, and it relates, in particular, to the arrangement and use of a line interface unit (LIU) in such a system.

2. Description of the Prior Art

Prior workers have made various investigations into digital switching systems for the communication field. Examples of these include the G. D. Johnson et al. U.S. Pat. No. 3,736,381 which is directed to a digital toll telephone switching system. Hybrid space division and time division switching networks are also known as evidenced by the M. E. M. Bosonnet et al. U.S. Pat. No. 3,689,701, and a paper entitled "Exploratory Pulse Code Modulation Integrated Switching and Transmission System for Local Networks" by S. R. Treves et al., at pages 77 to 88 of *Electrical Communication*, Vol. 47, No. 2, 1972. In the hybrid systems a space division switch is utilized for concentrating analog call signals which are then encoded in digital form and multiplexed prior to application to a time division switching network. In addition, Treves et al. teach the use of the switching network for limited communication between the central processing unit and the concentrators.

Further work in the time division switching field is found in a paper "ESSEX — A Continuing Research Experiment in Time—Separation Communication" by D. B. James et al., *The Proceeding of the Institution of Electrical Engineers*, Paper No. 3387E, November 1960, Vol, 107B, pages 330–335. One of the concepts utilized in the system described there is the employment of one bit per pulse code modulation word for unspecified functions and of one time slot per frame for supervisory functions.

A time division switch in a remote concentrator in which communication with a central office is provided by way of multiplexed supervisory and control signals in the call signal path is taught in the Inose et al. U.S. Pat. No. 3,492,435. The latter patentees also teach a line unit employed in their concentrator and in which there are performed functions such as 2-wire-to-4-wire conversion, analog-digital conversion, and multiplexing of coded call signals and a line status signal onto a common digital path. Inose et al. use low voltage tone ringing, rather than the high voltage low frequency ringing usually found in the public telephone network, to reach their line units. Their scanning system is used to initiate ring trip with the risk of false indications on lines with multiple ringers or of ring generator overload if scan sampling is limited to the no-ring interval.

Another paper, entitled "An Approach to the Implementation of Digital Filters" by L. B. Jackson et al., *IEEE Transactions on Audio and Electroacoustics*, Vol. Au-16, No. 3, Sept. 1968, pages 413–421, shows arrangements for time-sharing digital filters for limited purposes in a telephone switching office that could otherwise be either analog or digital.

It can thus be seen that digital switching offices have been tested in various forms to demonstrate the feasibility of time division switching. However a practical local office that is essentially digital from line unit inward has not been realized. It is suggested at page 35 in *Telephony*, July 17, 1972, in an article.

"SPC and TDS Dominate International Switching Meeting" by M. Hobbs, that the high cost of the digital local office has encouraged the hybrid office studies. Among the reasons are factors such as the need in a practical local, or end, office for a number of functions to be performed on a perline basis which usually calls for extensive distribution and control circuits, in addition to the regular call connection circuits, in the office. One example of such a function is ringing. A ringing relay at a line unit must be controlled, and ring-trip detection must be provided for high-level ringing signals that are widely used in the public telephone network but which cannot be switched through the electronic crosspoints frequently employed for time division switching. The cost of the distribution and control circuits for the ringing functions and for other functions, plus the cost of per-line analog-digital codec circuits, have heretofore made the digital local office a very costly project.

SUMMARY OF THE INVENTION

The burden of the foregoing and other problems in the implementation of digital local offices is reduced in accordance with an embodiment of the present invention by providing a highly multiplexed communication interface between circuits, at least one of which is a digital circuit. The interface provides convenience of managing communication between the circuits as well as providing highly flexible communication for purposes of maintenance. This interface is herein described with reference to one of the more difficult applications, the telephone line circuicentral-office interface; but it is also useful in other interface situations such as for analog or digital trunks. Thus, the interface is here illustrated as a particular type of line interface unit (LIU) used for a digital local telephone office. Such as LIU has a bidirectional analog signal port and a bidirectional time division multiplex highway port. The LIU also includes a circuit for coupling low frequency, analog, line signals, including direct current, around an alternating current, hybrid coupler in the LIU. Those low frequency signals are encoded in an analog-to-digital converter of the LIU.

It is one feature of the invention that the LIU is also provided with signal multiplexing facilities for coupling into the time division port of the unit both digital call signals and digital versions of the aforementioned low frequency signals, as well as digital status signals representing the states of various scan points in the LIU. Furthermore, the LIU includes demultiplexing facilities for deriving from the time division highway port both incoming digital call signals and incoming digital control signals for actuating various LIU controllable circuit functions.

It is another feature that there is also included within the digital local office a time division switching network for providing selectable interconnections for calls among LIU circuits in various blocks of such circuits. The network is operated by a common control which exercises the control of the LIU circuits and the network by communication through that same call connection network. In exercising the indicated LIU control, the common control receives through the network the digital representations of the analog low-frequency signals for processing; and it communicates corresponding control signals back through that network to the LIU.

Yet another feature involves a time-shared, digital filter, arithmetic unit for processing in real time the mentioned digital representations of telemetered low-frequency signals from plural LIU circuits and for plural purposes and in virtual simultaneity.

BRIEF DESCRIPTION OF THE DRAWING

A more complete understanding of the present invention and the various features, objects, and advantages thereof may be obtained from a consideration of the following detailed description in connection with the appended claims and the attached drawings in which:

FIGS. 4A and 4B are time base diagrams illustrating the operation of the digital local office of FIG. 1;

DETAILED DESCRIPTION

Figure 1:
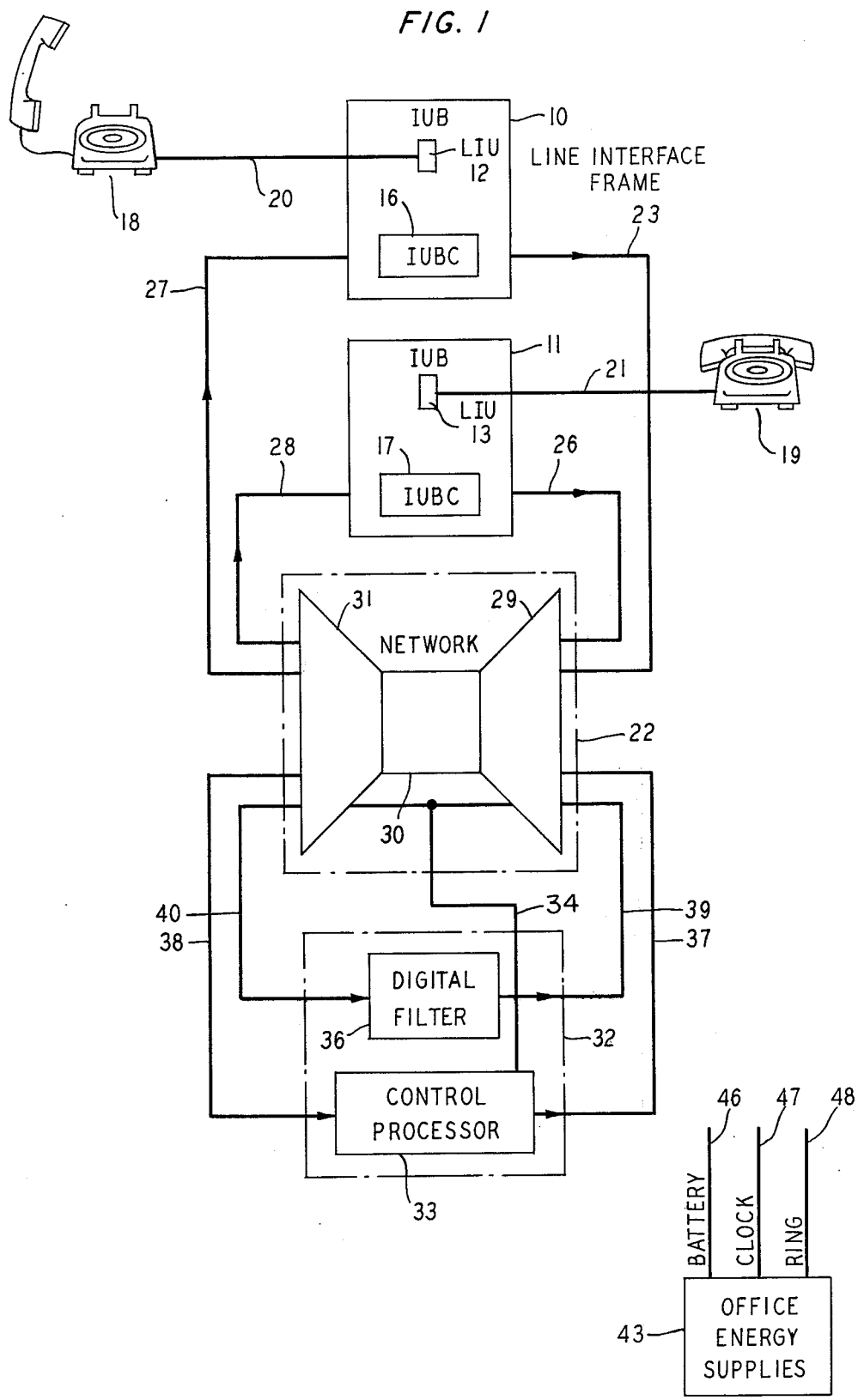
FIG. 1 is a simplified block and line diagram of a digital local office utilizing the present invention.

FIG. 1 illustrates in simplified form the electrical arrangement of a digital local office utilizing the present invention. This office utilizes a plurality of blocks of line interface units (LIU) such as the interface unit blocks (IUB) 10 and 11. Each block includes a plurality of plug-in line interface units such as the units 12 and 13 illustratively indicated in the blocks 10 and 11, respectively. Each line interface unit is plugged into a frame for such unit and is controlled by clock, address, and operation code signals supplied by an interface unit block control (IUBC), such as the IUBCs 16 and 17 in the blocks 10 and 11, respectively, in a way which will be described. Each LIU, as thus controlled, receives analog signals from a subscriber station, such as the stations 18 and 19, schematically represented as telephone station sets, by way of conventional 2-wire (tip and ring) analog circuits 20 and 21, respectively.

Figure 2:
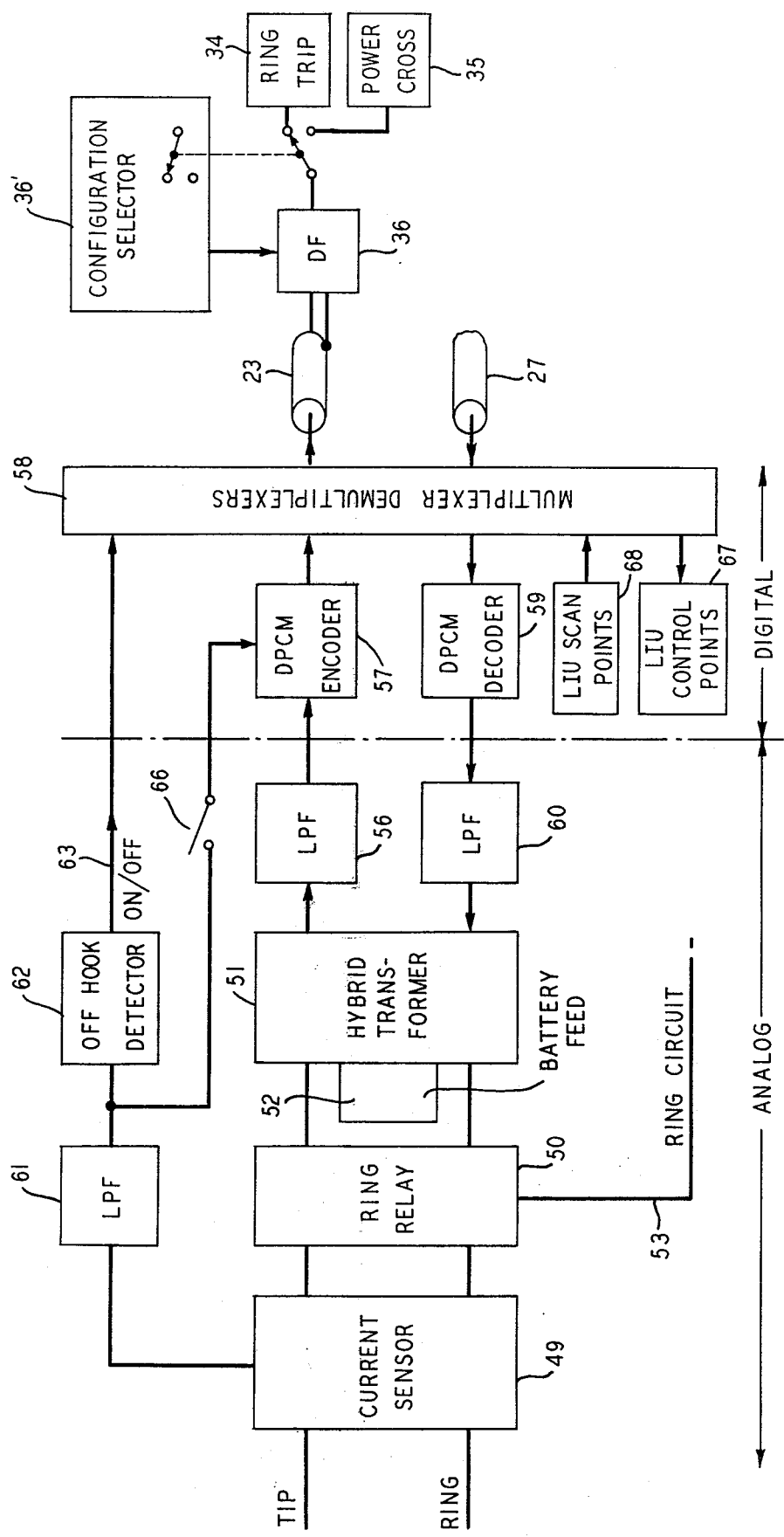
FIg. 2 is a simplified block and line diagram of a line interface unit of the type employed in FIG. 1.

FIG. 2 is a simplified block and line diagram of an LIU, such as the LIU 12 in FIG. 1. Each such LIU includes, for so-called plain old telephone service (POTS), an analog part and a digital part. These parts will be hereinafter described in detail, but for the moment it is convenient to indicate in outline the functions performed for each part to facilitate further description of the system of FIG. 1. All of the circuits indicated in FIG. 2 are advantageously included on a single plug-in LIU for communication line coming into the digital local office. Thus, the LIU includes a 2-wire analog port including tip and ring connections for tip and ring conductors of a POTS line. Those connections are coupled through a current sensor 49 and a ring relay circuit 50 to the bidirectional 2-wire analog port of a hydride coupler, such as the hybrid transformer 51. A battery feed circuit 52 is also included for supplying central office talking battery to the line circuit through the hybrid in the usual fashion. The ring circuit 53 is an extension of a ring bus 48 in FIG. 1.

Transformer 51 has a 4-wire connection, or port, which includes a 2-wire output, or transmitting, connection through a transmitting low-pass filter 56 to a differential pulse code modulation (DPCM) encoder 57. The encoder output is coupled through multiplexer-demultiplexer (muxdem) circuits 58 to an LIU 4-wire digital port including a 2-wire connection to a transmitting circuit 23 of the time division highway between the LIU and the network 22 in FIG. 1. Similarly, a receiving circuit 27 of that highway is coupled through the muxdem circuits 58 to a DPCM decoder 59 and a receiving low-pass filter 60 to the 2-wire input connection at the 4-wire port of the transformer 51. Circuits 23 and 27 of the time division highway are advantageously coaxial cables. One advantageous coder and decoder for this application are shown in the J. H. Condon U.S. Pat. No. 3,723,909.

The current sensor 49 provides an output signal which is substantially linearly proportional to the net line current flowing in the tip and ring connection of the LIU. Output from the current sensor 49 is coupled to a low-pass filter 61 having a cutoff frequency at approximately 40 Hz. This cutoff frequency is selected so that signals in the range from direct current through approximately 100 Hz are passed either with little attenuation or with specific predetermined attenuation. This range includes components at the low end normally employed for signaling in telephone systems in what is known in the art as out-of-band signaling. As herein employed, the term out-of-band signaling refers only to such signaling which is below the normal voice frequency band and not to out-of-band signaling above the voice frequency band. The voice frequency band is determined in part by the characteristics of the hybrid transformer 51 which has a lower cutoff frequency at about 250 Hz, and in part by the low-pass filters 56 and 60 which effect an upper cutoff frequency of approximately 6000 Hz.

The output of low-pass filter 61 is applied to an off-hook detector 62 which provides, on an output circuit 63 to the muxdem circuits 58, a digital signal indicating whether or not the subscriber which is coupled to the tip and ring connections is in an off-hook condition. Output of the low-pass filter 61 is also coupled through a remotely controlled switch 66 to the analog input of the encoder 57. The switch 66 is closed in response to a signal received through muxdem circuits 58 when the illustrated LIU is placed in the service state, so that out-of-band signals are encoded by the encoder 57 and multiplexed onto the circuit 23 in a call time slot assigned to the illustrated LIU as will be described.

In the last-mentioned case of telemetered signals being multiplexed onto circuit 23, the use thereof can be briefly outlined. Thus, circuit 23 is coupled to a programmable digital filter 36 which has its circuit and coefficient configuration set by a configuration selector 36' which is advantageously a control memory for the filter. Selector 36' arrange filter 36 to detect each of particular signal characteristics at particular selectable times. In addition, the filter output is coupled to an appropriate detector in the selectable time to indicate whether or not the filter output exceeded a predetermined threshold for the characteristic of interest. To this end a selector switch operated in conjunction with selector 36' connects the filter output to, for example, either a ringtrip detector 34 when examining telemetered signals for direct current in the presence of alternating current ringing signals, or a power cross detector 35 when examining telemetered signals for the presence of 50 Hertz or 60 Hertz current.

The ring relay circuit 50 includes a relay-actuated switch which couples the tip and ring connections from the current sensor 49 either to the ring circuit 53 for ringing the connected subscriber or to the hybrid transformer 51 for permitting that subscriber to communicate through the LIU to the network 22 in FIG. 1. The condition of the ring relay is controlled by a signal which is received through the muxdem circuits 58 as will be described. Relay circuit 50 and switch 66 represent two of the LIU control points which are schematically represented by the block 67 labelled "LIU Control Points," and which points are operated by signals from the muxdem circuits 58. Similarly, a block 68 in FIG. 2 is labelled "LIU Scan Points" and schematically represents the coupling to the muxdem circuits 58 of signals representing the states of relay circuit 50, switch 66, and other LIU circuit functions to be hereinafter described.

Figure 3:
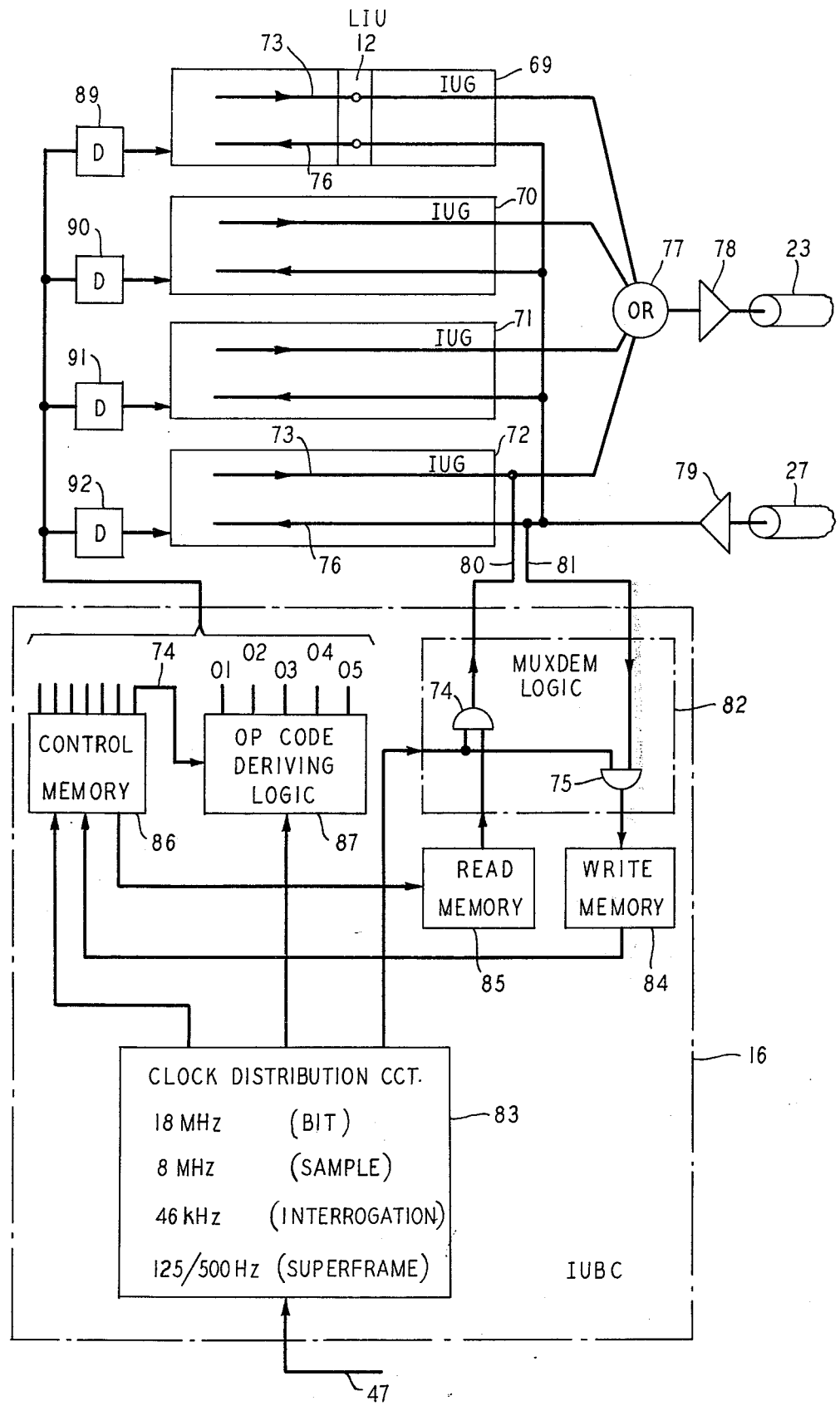
FIG. 3 is a block and line diagram of an interface unit block of the digital local office of FIG. 1.

FIG. 3 is a simplified block and line diagram of an interface unit block, such as the IUB 10 in FIG. 1 and is also here described to facilitate further description of FIG. 1. This block contains four LIU groups 69, 70, 71, and 72, each advantageously including sixty LIUs. The LIU 12 is schematically indicated in the group 69, but other LIUs are not specifically indicated in order to avoid unduly complicating the drawing. Transmit and receive buses 73 and 76 extend throughout each LIU group and are connected to each unit of the group to provide coupling for those units to the time division highway serving the IUB. For this purpose, the transmitting bus 73 is coupled through an OR gate 77 along, with corresponding transmitting buses from the other groups of LIUs, to an amplifier 78 which further couples those circuits to the transmitting circuit 23 of the time division highway. Similarly, the circuit 27 of the time division highway is coupled through an amplifier 79 to the receiving buses 76 in parallel in all of the interface unit groups.

The interface unit block controller (IUBC) 16 has connections 80 and 81 which extend to the transmit and receive buses 73 and 76, respectively, of the LIU group 72; and these connections 80 and 81 are coupled to muxdem logic 82 to permit communication between the IUBC 16 and the time division highway to network 22 in, e.g., two predetermined time slots. It should be noted at this point, although only one highway and one IUBC are shown in FIG. 3, each IUB is advantageously served by a pair of time division highways and a pair of IUBCs, sometimes designated the A and B data rails and the A and B controllers, respectively. Such dual facilities provide a degree of redundancy which facilitates load sharing and provides advantageous backup facilities in the event of failure of one set of equipment. Such redundant arrangements are well known in the art and, therefore, only the A set of data rails and the A IUBC are shown in FIG. 3. Insofar as the IUBC is concerned, either of the redundant units can be utilized for any time slot transmission as determined by the common control operation at the time that a call connection is being set up. However, only one interface unit can utilize anyone of the sixty call time slots available on a particular data rail at one time.

The IUBC 16 is operated under the joint control of office clocks, received from an office clock bus 47 at an IUBC clock distribution circit 83, and two-way data communications with a common control by way of the network 22 in FIG. 1. In the distribution circuit 83 in FIG. 3 are indicated the five principal frequencies typically utilized by an illustrative embodiment of the present digital local office. Office clock signals are further extended to the LIUs by circuits (not shown) in FIG. 3. The clocks include the approximate frequencies of 18 MHz for the bit clock time, 8 MHz for the coder-decoder sampling clock time, 46 kHz for interrogating the current sensors 49 in the various LIUs, and 125 Hz and 500 Hz for superframe timing to be subsequently described. Actual frequencies advantageously employed in one embodiment were 18.432 MHz, 8.192 MHz, 46 KHz, 125 Hz and 500 Hz, respectively; but the approximate frequencies are hereinafter usually mentioned for convenience.

Signals derived from the 8 MHz clock train by wired logic (not shown) are applied to muxdem logic 82 to enable communication between the IUBC 16 and the time division highway during the aforementioned two time slots set aside for that purpose. The logic 82 is a set of clock controlled gates, such as gates 74 and 75, that are enabled during those two time slots to establish bidirectional communication between the IUBC and the time division highway. During those time slots, the gate 75 passes a control word to write memory logic circuit 84; and the gate 74 passes a word from read memory logic circuit 85 to the time division highway. Circuits 84 and 85 and their respective leads to control memory 86 schematically represent the performance of the usual functions such as buffering, address translation or recognition, operation code decoding, and data steering. Circuits for performing such functions are well known in the art for the control of peripheral units, and their details comprise no part of the present invention so the functions will be merely outlined in connection with operation of the control memory 86 in IUBC 16. For an incoming control word, the address of IUBC 16 is recognized to enable further operations. The operation code is decoded to enable the appropriate function, e.g., either reading or writing of the control memory, and address information is translated for enabling the appropriate memory word location. The data field, e.g., the name of an LIU, of the control word is then, for a writing operation, applied to the memory bit circuits for overwriting the enabled word location. Similarly, an outgoing word is assembled in read memory logic 85 to include the IUBC address, the name of the location read from memory 86, and the contents of that location.

The 10 MHz clock s applied to the control memory 86 which stores words in 256 memory locations of which 60 are used for each of the four groups of the block. Those locations are recurrently sequentially addressed by the 18 MHz clock to produce four data elements (only one of which is a valid LIU name), in different bit times of each time slot of a frame, needed to determine which of the LIUs of each of the four groups of the block should be operated and in which manner it should operate. This four-phase addressing technique permits the addressing of 240 units with only six address bits. As already noted in regard to the two control time slots, the control memory can be randomly accessed under command of the common control to change or sample specific time slot information. Each 7-bit word location read out of the memory 86 provides a 6-bit address identifying a single LIU in the group of the IUB, and a 7th bit for selecting either the A or the B data rail to be used by that LIU.

Office clock signals are resolved by operation code deriving logic 87 for fixing the sequence of codes needed for the recurrent series of sample frames, time slots, and bits that make up a status frame, as will be hereinafter outlined in connection with FIGS. 4A and 4B. Various forms of logic for deriving such a sequence from clock signals are known in the art and require no further discussion. These operation codes direct the performance of necessary LIU functions, as will be described, for effecting communication at the proper time in the proper mode, i.e, communication of call signals or communication of status or control signals. Five control signal bits 01 through 05 are provided at the output of logic 87 to identify by their binary coded permutations different ones of the thirty-two operation codes indicated in FIGS. 4A and 4B. A lead 74 extends one of the seven control memory output leads to logic 87 to be used in determining which data rail an addressed LIU should use. In the LIUs, individual operation code bits or groups of such bits are employed to actuate various LIU functions as will be shown in regard to FIGS. 6A and 6B.

LIU address words read from the control memory 86 and operation codes provided by the operation code deriving logic 87 are coupled in bit-parallel fashion from the IUBC 16 through control signal drivers 89, 90, 91, and 92 to the respective LIU groups 69 through 72. Outputs from these drivers are supplied on buses, not specifically shown in FIG. 3, to every LIU of the corresponding LIU group. The drivers are actuated in a four-phase rotating sequence to accommodate the four-phase readout of memory 86 which has previously mentioned.

Returning now to FIG. 1, IUBs 10 and 11 are each served by a 4-wire time division highway, for providing call signal coupling, supervision, and control communication, to the digital switching network 22. These highways include 2-wire, coaxial, transmitting circuits 23 and 26 from the respective IUBs 10 and 11 to network 22. Similarly, 2-wire, coaxial, receiving circuits 27 and 28, respectively, are extended from the network 22 to the IUBs 10 and 11. A single line in the drawing of FIG. 1 schematically represents each of these 2-wire circuits.

Network 22 receives digital inputs at the right-hand side thereof as illustrated in FIG. 1, and provides switched digital outputs at the left-hand side thereof. This network includes a concentrating switching stage 29, a switching matrix stage 30, and an expansion switching stage 31. All stages of the network 22 advantageously employ electronic switching crosspoints, such as coincidence gates, enabled in appropriate time slots by signals from a network control memory (not separately shown) to couple digital signals between network horizontal and vertical rails utilized for that particular time slot. The concentrating and expansion stages 29 and 31 are provided in addition to the concentration and expansion which normally take place at the LIU multiplexing and demultiplexing interface.

Details of network 22 can be those of any time division switching network suitable to the described purpose and many such network arrangements are presently known in the art. It is, however, advantageous in terms of cost and operating convenience if the network is arranged in a mirror-image format which provides essentially identical path configurations in both the input and output halves of the network, and which includes time slot interchanger (TSI) circuits (not separately shown) at the center of the network. An example of a switching network for a time division system and including TSI facilities at the center thereof is taught in the aforementioned Inose et al patent. It is also advantageous to arrange the operating algorithm of the time slot interchanger circuits so that there is an integer number of frame delays from any LIU codec to the center of the network, and such arrangements are also known in the art. For this purpose there is added to the TSI output time slot number that would otherwise be assigned a sufficient number of time slots to round up the uncompensated network delay to the integer number of frame delays. It will be subsequently seen that each LIU includes a unit of buffer storage in its codec and this permits the switching arrangement, thus far described in FIG. 1, to be characterized as a store (LIU) — switch (concentrating and matrix input stages) — store (TSI) — switch (matrix output and expanding stages) — store (LIU) system.

Various time division switching network control and call processing hardware and methods are known in the art so network control and call processing are here discussed only to the extent necessary to indicate the utilization of known digital filter techniques for evaluating signals telemetered around the LIU hybrid to the coder input. In FIG. 1 a common control 32 is schematically represented as including a processor 33 and a digital filter 36. A lead 34 extends to the network stages 29–31 for schematically representing control thereof; however, this control can also be exercised by having processor 33 communicate through the network with network control memories in a manner similar to that already outlined in connection with the IUBC memory 86 in FIG. 3. Instead of the usual separate scanning circuits and control signal distribution circuits, central control 32 communicates through the switching network with the LIUs. This communication is effected in various scanning and control time slots as will be described, and the network is operated to steer those control time slot signals to and from central control using different network ports much as the network is operated for call connections among subscribers. That is, many of the scan and signal distribution circuits normally found in a local office are instead multiplexed onto TDM circuits through the switch network the same as call signals. The principal separate distribution circuits here retained are those for the office energy supplies 43 in FIG. 1. Those supplies provide battery on a bus 46, clock on a bus 47, and ringing signals on a bus 48, as required, to the common control, the network, and the LIU frames.

Within common control 32, a control processor 33 schematically represents all of the usual control and processing functions except certain signal evaluation functions performed by a time-shared digital filter 36. Processor 33 transmits to the network by way of a two-wire, time division circuit 37 and receives from the network by way of a two-wire, time division circuit 38. Digital filter 36 similarly communicates through the network by circuits 39 and 40. The previously cited Jackson et al. paper teaches the use of time-shared digital filters in a telephone office. In addition a programmable digital filter is taught in the U.S. Pat. No. 3,706,076 to P. A. Schuster.

It will be helpful to a subsequent understanding of the circuit details to be described if the operations for setting up and taking down a call connection are here outlined. For this purpose, it is assumed that the subscriber station 18 represents the calling party and the subscriber station 19 represents the called party. When the station 18 goes off-hook, the flow of direct current in the line 20 actuates the scan signal deriving circuits (61, 62, 63) in the LIU 12, and that signal is multiplexed onto the highway 23 for transmission through network 22 to the common control 32.

Now common control 32 provides a signal on its transmit highway 37, through network 22, and receive highway 27, in the ninth bit of the scanning reverse time slot assigned to the calling LIU to switch the LIU into the service state, i.e., close switch 66 in FIG. 2. The scanning reverse time slot is the same as the scanning time slot but on the network-to-LIU time division highway. A call, or data, time slot is also assigned. In the service state, the LIU out-of-band signals are telemetered around the LIU hybrid transformer 51 into the LIU coder 57 and then multiplexed in the assigned call time slot for transmission by highway 23, network 22, and receive highway 40 to the digital filter 36.

Processor 33 transmits digitally coded dial tone by its transmit highway 37, network 22, and receive highway 27 to be received in the calling LIU in its assigned call time slot. That tone is decoded in the LIU and provided to subscriber station 18 in analog form. Processor 33 now receives, by way of the telemetering switch 66 and the aforementioned path from LIU 12, either dial pulses or pushbutton dialing tones, all in digital form, to identify the called party by directory number. The dialing signals are received in the same time slot used to send the dial tone. Once the called number has been received, processor 33 translates the dialed number and ascertains a call path through network 22 to the called party, i.e., IU 13, from LIU 12. If the called party is not busy, the processor initiates the service state in LIU 13 and determines and sets up a free time-space path through network 22 between the processor and LIU 13.

The processor 33 now sends a signal in the ninth bit of the call time slot assigned to LIU 13, and that ninth bit is demultiplex by the LIU to operate the called unit ring relay. Digital filter 36 receives the telemetered inband signals from the called LIU in the service state by way of transmit highway 26, network 22, and receive highway 40, and monitors those signals to detect the onset of direct current in the called line 21 thereby indicating that the called station 19 has gone off-hook in response to ringing. At that time the processor 33 is advised, and its signals LIU 13 in the ninth bit time of its time slot to de-energize the ring relay, thereby terminating the application of ringing signal to the called party. At the same time processor 33 takes down the time-space connections between filter 36 and LIUs 12 and 13 and reconfigures network 22 to interconnect a path between the previously assigned time slots of those two LIUs. The parties are now able to communicate over the latter path, which path includes transmit highway 23, network 22, and receive highway 28 for one direction and transmit highway 26, network 22, and receive highway 27 for the opposite direction of communication. Between LIU 12 and the TS1 of stage 30, the calling time slot is used; and between LIU 13 and the TS1 of stage 30, the called time slot is used.

Similar operations take place when a call is terminated. Thus, when a party goes on-hook the processor causes erasure of the corresponding IUBC control memory word for the time slot that was in use by the LIU and causes erasure of the network 22 control memory words for the call connection. Similarly, the memory of the IUBC of the other LIU of the same call connection is erased when its subscriber station goes on-hook.

In FIGS. 4A and 4B there are shown time base diagrams for the digital local office of FIG. 1. In FIG. 4A several 9-bit time slots from a single sample frame, i.e., a frame required to supply a time slot sample from each time division multiplex channel of a highway for call connections on that highway, are shown along the left-hand side of the figure. Each time slot illustratively includes nine bit times (numbered at the left from top to bottom in the Drawing). The number of time slots, 64 in the illustrative embodiment being considered, does not usually indicate the number of LIUs in the corresponding IUB because of the aforementioned concentration in multiplexing at the IUB level.

The time slots shown in FIG. 4A include a typical data time slot at the top; and there are, for example, sixty such time slots in a sample frame for an illustrative embodiment. These are the time slots used to communicate call connection signals and they are thus sometimes called "call time slots." In addition, in FIG. 4A there is a scan time slot, otherwise sometimes called a request-for-service time slot, and a further time slot indicated simply as the last time slot of the sample frame. Not shown in FIG. 4A are the time slots 61 and 62 of the illustrative embodiment which are advantageously utilized, as previously mentioned, for communication between common control 32 and the various control memories in the digital local office.

To the right of each bit time in FIG. 4A is an operation code designation (shown in the drawing in decimal form) indicating operation codes which are provided in bit parallel by each IUBC to determine the nature of operation of LIUs controlled thereby. The various operation codes are indicated in FIG. 4B along with the functions controlled by each. Some of these codes are, in the drawing, indicated as not being presently in use and are reserve codes for different functions that can be provided in an analogdigital interface unit for some purpose, e.g., key telephone control, other than the plain telephone service system illustrated.

The operation code for each bit time of a data time slot in FIG. 4A is the code designation 24 which indicates that the LIU should communicate on the B data rail to the switching network 22. The numeral 16, in parentheses adjacent to the left-hand column of operation codes for the data time slot, indicates the possibility that the LIU under consideration could alternatively be required to communicate on the A data rail. In a data time slot the operation codes are supplied to all LIUs of the IUB, but only those specifically addressed as hereinafter outlined actually operate in response to such codes.

In the scan time slot, seven operation codes are provided in a recurrent sequence for each sample frame in the first seven bit times of the time slot; and the seventh code, i.e., that designated 31, is also provided during the eighth and ninth bit times. The repetition forces two operation codes to be present in the latter bit times, which are not needed for the illustrative embodiment but are reserved for future use, to be sure that no spurious operation is initiated during those bit times.

Each of the IUBs has its scan time slot in a different time slot of the sample frame to facilitate time sharing of a processor among plural IUBs without the need for buffer storage. Codes 25–31 direct operations with respect to the B data rail, and codes 17–23 in parentheses indicate A data rail operation. Each of the scan time slot operation codes causes the addressed LIU to send on its transmit highway toward network 22 a different bit of a 9-bit byte indicating in each bit time the status of a different circuit scan point in the LIU. This status information is provided for a different LIU of an IUB during the scan time slot of each frame of a recurring frame sequence called a status frame, or sometimes called a superframe. Thus, for an IUB with four groups of LIUs of sixty LIUs each, a status frame extends for 240 sample frames. Similarly, the LIU addressed during a particular scan time slot receives from the common control, by way of network 22, control bits directing that some LIU circuit, a control point, assume a predetermined state corresponding to the operation code in that particular bit time. That control function has thus been designated the scanner reverse channel function. In the illustrative embodiment herein considered, the principal control signal thus transmitted during the scan time slot is a signal from the common control 32 to set the LIU into the service state. However, other functions can also be advantageously provided, such as providing signals to exercise control of circuits (not shown) in the LIU for operation of a subscriber station that has coin features.

In the last time slot of each sample frame, only the last three bit times are advantageously employed in the illustrative embodiment presently under consideration. All LIUs respond to these operation codes. In the bit time 7, the operation code designation 1 indicates a signal for inhibiting a counter in each LIU codec as will be described. Similarly, in bit time 8 the operation code designation 7 indicates another inhibition of that same counter operation and directs a control signal for loading the counter also as will be described. Bit time 9 can include different ones of the operation codes 8 through 15, each of which causes the clearing of all LIU coder counters and selects a particular ninth bit for particular control operations such as operating the ring relay. As indicated on the bottom line of FIG. 4A, this ninth bit time operation code is usually the code designated 15 to cause the LIU to output the LSB of digital speech signals. The codes 8 through 14 are used in substitution for that code in the last seven sample frames of each status frame; and their functions, some of which have not yet been mentioned, are 8-hold service state, 9-actuate ring relay, 10-close switch 66, 11-enable LAMP CLK signal, and 12–14-not defined.

The operation codes 0, 1, 7, and 8 through 15 recur periodically in the pattern indicated at the bottom of FIG. 4A. The codes 16 through 31 also recur periodically; but the codes 16 through 23 direct the stated interface unit operations with respect to the A rail and the codes 24 through 31 direct those same operations with respect to the B rail, the latter selection being specified by common control when writing a control memory and being implemented by the signal on lead 74 in the IUBC of FIG. 3.

ANALOG PART OF LIU

Figure 5:
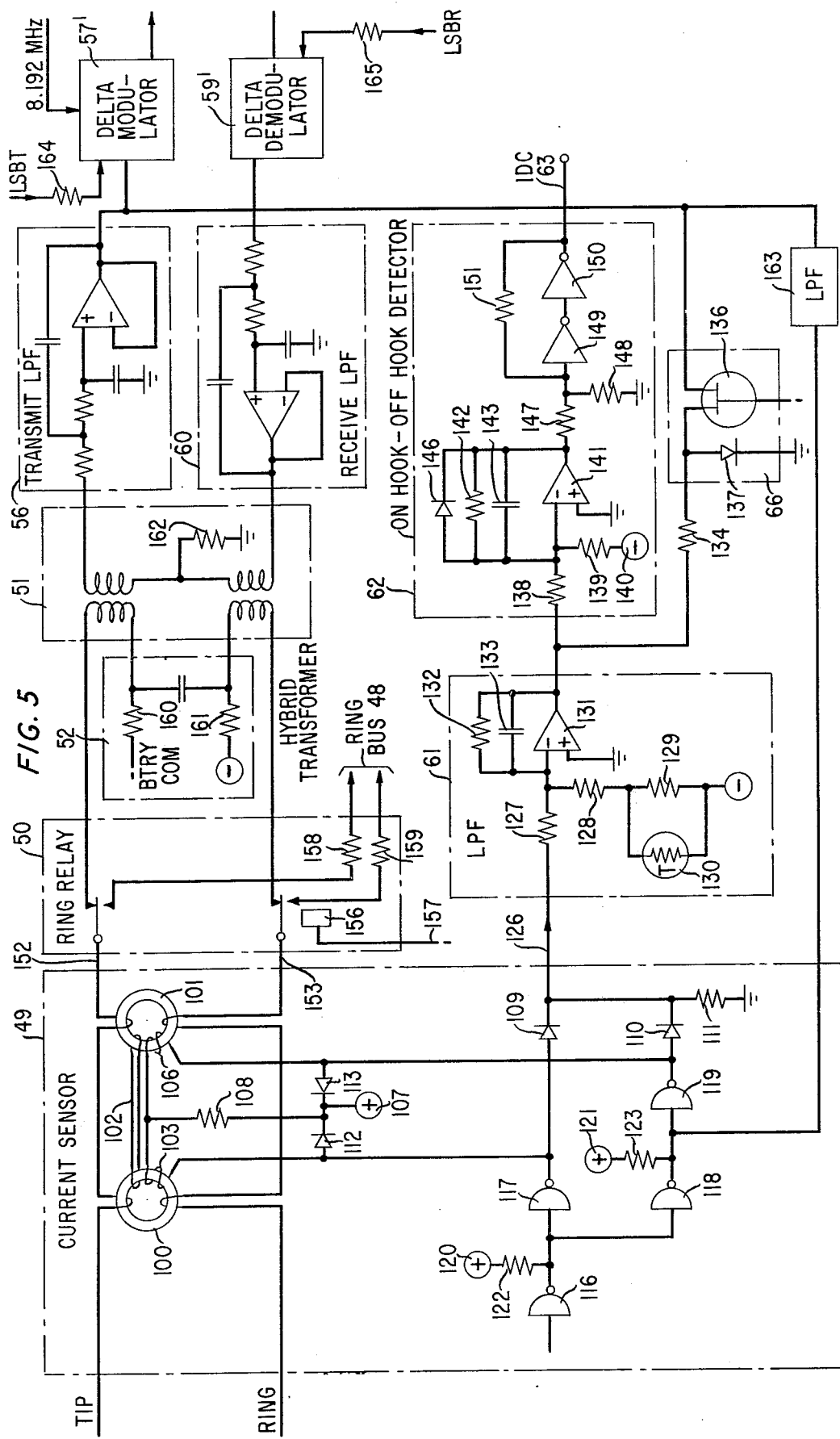
FIG. 5 is a schematic diagram of the analog portion of a line interface unit of FIG. 2.

FIG. 5 includes schematic detail of the analog part of the LIU shown in block form in FIG. 2. The current sensor 49 is a magnetic amplifier, and it includes two saturable magnetic cores 100 and 101 having essentially the same characteristics, which include a narrow hysteresis characteristic. The LIU tip and ring line circuit connections constitute the control windings for cores 100 and 101. The tip connection links both cores in the same sense. Likewise, the ring connection links both cores in the same sense; and the latter sense is such that circulating current in the line circuit has an aiding effect on the respective cores for both the tip and ring connections. Thus, longitudinal currents in the line circuit produce offsetting effects on the cores 100 and 101, but net circulating current in the line produces aiding effects on the cores. A single shorted turn 102 links both cores so that circulating current in the link would induce flux in the same direction in both cores. Wire utilized for the shorted turn 102 is advantageously selected of a size to provide an inductance-resistance time constant of about 1 ms for the arrangement using a 46 kHz interrogation drive. Shorted turn 102 has the effect of adjusting flux in each of the cores 100 and 101 to account for manufacturing differences in the circuits of the two cores, and the turn also reduces the series inductance presented to the subscriber line circuit due to the linking of tip and ring connections with the cores 100 and 101.

Interrogation windings 103 and 106 link cores 100 and 101, respectively, in opposite senses with respect to the direction of current flow in those windings from a source 107 of direct current by way of a resistor 108. The source 107, and other sources illustrated in the drawings of the present application, are schematically represented by a circled polarity sign indicating connection of a terminal of the polarity indicated of any suitable source of direct current which has its terminal of opposite polarity connected to ground. The source 107 provides bias current to the interrogation windings 103 and 106 in parallel, and that current returns by way of diodes 109 and 110 and a resistor 111 to ground. A pair of diodes 112 and 113 complete a diode bridge connection with the diodes 109 and 110, which bridge allows the interrogation windings 103 and 106 to be driven in a push-pull fashion from a 46 kHz supply without disturbing the direct current source 107. The interrogation drive is a 46 kHz square wave, the frequency being selected at a level which is well above any frequencies anticipated on the subscriber line. This drive is coupled, from the IUBC clock distribution circuit 83, through a first NAND gate 116, and the output of that gate is split to be applied in opposite phases to the interrogation windings, respectively. One branch is applied through a NAND gate 117 to the terminal of winding 103 which is common to diodes 109 and 112. The other branch includes NAND gates 118 and 119 which apply the opposite phase of the interrogation drive to the terminal of winding 106 which is common to diodes 113 and 110. Operating potential for gates 116 and 118 is provided by positive sources 120 and 121 through resistors 122 and 123, respectively. Gates 117 and 119 receive operating current from source 107 through the windings 103 and 106, respectively.

The interrogation drive switches cores 100 and 101 back and forth between their respective saturation states, and the voltages thereby induced in the tip and ring connections of the subscriber line cancel when the cores switch at the same time to opposite states. This type of operation produces a symmetrical output on a lead 126 to the filter 61 if there is no net current circulating in the subscriber line circuit. Likewise, if the circuit is reasonably well balanced, there will be a minimum amount of the 46 kHz interrogation signal in the output on lead 126. If there is a net line current in the subscriber line, it biases the cores 100 and 101 from their quiescent level and thereby destroys the symmetry of the output so that the output on lead 126 is linearly proportional to the magnitude of the net current in the subscriber line circuit, including the LIU tip and ring connections. A dither signal is derived from the output of gate 118 for a purpose which will be subsequently described.

The low-pass filter 61 includes an input potential divider comprising a series resistor 127 and two series connected shunt resistors 128 and 129. This potential divider reduces the signal on lead 126 to about two-thirds of its received level, so that it is comparable in amplitude after filtering to the level it would have had if it could have been coupled through the transformer 51 and transmitting low-pass filter 56. A thermistor 130 shunts resistor 129 to compensate for temperature effects upon the cores 100 and 101. An operational amplifier 131 has a feedback from its output to its inverting input through a parallel connected resistor 132 and capacitor 133 to provide a conventional active low-pass filter design with a cutoff frequency at about 40 Hz. The inverting input of amplifier 31 is also connected to the junction of resistors 127 and 128. The indicated cutoff frequency is above the 20Hz high voltage ringing frequency widely used in the public telephone network, but the frequency is below the lowest speech frequencies of interest.

Output from filter 61 is coupled through a resistor 134 and the switch 66 to the analog signal input of the LIU coder. That coder is schematically represented in this figure comprising the analog portion of the LIU as a delta modulator 57' with a sampling clock signal of 8.192 MHz, i.e., the 8 MHz clock from the IUBC. Such a delta modulator is, in fact, included in the encoding arrangement taught in the aforementioned Condon patent along with associated logic for converting the delta modulation signal to differential pulse code modulation. Switch 66 couples out-of-band signals to the delta modulator, but inevitably a certain amount of in-band signals are similarly coupled when the LIU is in the service state, i.e., switch 66 closed. The latter signals are also coupled through transformer 51 and filter 56 to the coder input. Resistor 134 attenuates the signals from filter 61 to avoid overloading the coder by the same signals from both switch 66 and filter 56 when the LIU is in the service state with out-of-band signaling in progress. Switch 66 is an insulated gate field effect transistor 136 with its source terminal connected to ground through a signal limiting diode 137. The transistor 136 is controlled by a 9th bit control signal as already described and comprises one of the control points schematically represented by the block 67 in FIG. 2.

Output from filter 61 is also coupled through a hook detector circuit 62 to the lead 63 previously noted in connection with FIG. 2. This input is further divided down by about three-fifths by a potential divider including a series resistor 138 and a shunt resistor 139 which is connected to a negative potential source 140. Output of that potential divider is applied to the inverting input of an operational amplifier 141 that is arranged to operate as a 0.3 Hz low-pass filter. For this purpose, the noninverting input of the amplifier is grounded; and a feedback path to the inverting input includes a parallel-connected resistor 142 and capacitor 143. A 6.3 volt breakdown diode 146 provides additional smoothing and is connected in parallel with resistor 142 and poled for forward conduction toward the output of amplifier 141. This filter arrangement provides an output for low-frequency signals from filter 61 which represent service requests, or a busy condition, on the subscriber line; but it blocks line hits due to lightning or power cross or the like. Consequently, the hook detector circuit 62 cannot be used as a source of signals for counting dial pulses.

Output from the amplifier 141 is further reduced by a potential divider including resistors 147 and 148 and coupled through a threshold detector circuit, such as a Schmitt trigger, including tandem connected inverters 149 and 150 and a feedback resistor 151. Thus, the output signal on lead 63 is a digital signal having one or the of two binary signal states depending upon whether or not direct current is flowing in the subscriber line circuit.

Leads 152 and 153 comprise an extension of the tip and ring connections of the subscriber line circuit to the ring relay 50. That relay is a double-pole-double-throw switch having an operating coil 156 which is controlled by a signal on lead 157 as one of the LIU control points 67 noted in connection with FIG. 2. When the relay is operated it connects the leads 152 and 153 through current limiting resistors 158 and 159 to the office ring bus 48. Otherwise, when the relay is not operated, the leads 152 and 153 are coupled through to the hybrid transformer 51 in the usual fashion and through windings of that transformer to the battery feed connection 52, i.e., battery bus 46 in FIG. 1. In the latter connection, positive talking battery is applied through a resistor 160 to the tip side of the line and negative battery is connected to the ring side through a resistor 161.

In the hybrid transformer 51 a balancing resistor 162 is connected between the common terminal of the two windings on the 4-wire side and ground. Conventional active low-pass filters are coupled between opposite terminals of the transformer windings on the 4-wire side and the input of delta modulator 57' and the output of delta demodulator 59'. Although these filters are of conventional third order design, their characteristics are uniquely selected to perform the tasks required for the LIU with comparatively low cost. Thus, the transmitting filter 56 limits the voice band to about 6000 Hz. In addition, it prevents the 32 kHz sampling rate of the overall coder, plus or minus 3.4 kHz, from aliasing into the audio band. This result is achieved by having the filter cutoff frequency at about 6 kHz with an above-band characteristic such that the indicated DPCM frequencies are down by about 30 decibels. Similarly, the receiving low-pass filter 60 is designed to remove the side band frequencies around multiples of the sampling frequency employed in the decoder. For this purpose, the filter has a cutoff frequency at about 15 kHz and frequencies in the range of 30 kHz and above are down about 20 decibels.

A dither signal is applied from the output of gate 118 in current sensor 49 through a low-pass filter 163 to the analog signal input of the delta modulator 57'. This dither signal spreads the noise, due to coder step imbalance, over the band of interest so that idle channel noise appears as white noise within acceptable amplitude levels and is not usually subjectively objectionable to subscribers. The 46 kHz signal produces, by frequency aliasing, a signal at 14 kHz which is found to represent a good compromise between the removal of step imbalance noise and audibility of the dither signal. Filter 163 converts the 46 kHz square wave obtained from the current sensor 49 to a sign wave configuration with an amplitude which is approximately equal to several code levels for the delta modulator 57′.

DIGITAL PART OF LIU

Figure 6A:
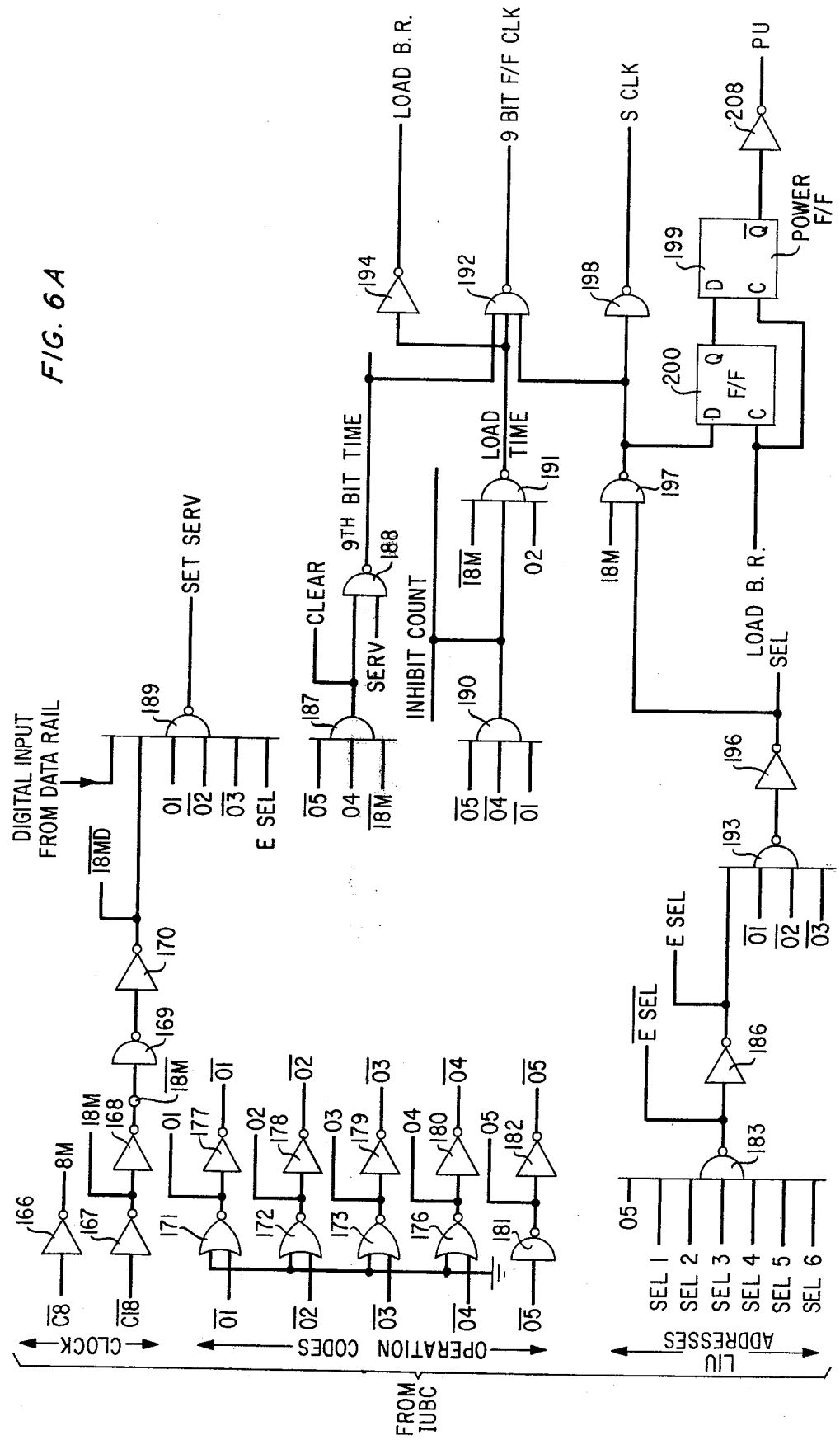
FIGS. 6A and 6B are block and line diagrams of control signal deriving logic for the digital portion of a line interface unit of FIG. 2 and of such digital portion for that interface unit, respectively.

Turning now to the digital part of the LIU, FIG. 6A will be described wherein the operation-determinative signals for an LIU are derived from the control signal buses extending through an LIU group, such as the group 72 in FIG. 3, from an IUBC 16 by way of a driver 92. In this FIG. 6A are shown the logic circuit arrangements contained in an LIU plug-in unit and responsive to clock signals, operation codes, and address signals supplied on the group bus as just indicated. These logic circuits produce signals which determine the operations of various LIU parts at the correct times within the time base framework previously discussed in connection with FIGS. 4A and 4B. Derived operation-determinative signals are named at the ends of leads in FIG. 6A and those signals are utilized in FIG. 6B on similarly named input leads. A first level of the operation-determinative signals is rather routinely and relatively independently derived from the LIU bus just mentioned. A second level of operation-determinative signals is derived from various ones of the first level signals.

In FIG. 6A and in other drawings herein, various conventional logic circuits are employed, the simplest, of course, being circuits for providing AND, NAND, NOR, and inverting logic functions. These produce the usual operations. For example, in the AND circuit a coincidence of high input signals produces a high output signal; and, otherwise, the output is in a low voltage state. The NAND circuit is the complement in that it always produces a high output unless there is a coincidence of high signals on all of its input connections. Similarly, a NOR gate couples any low input signal through as a high output signal; and if both inputs are low, the output is still high. An inverter performs logically the function of a single-input NAND gate.

Flip-flop circuits are also utilized and are usually the D-type of flip-flop. In the D-type flip-flop, the circuit is enabled by a clock input to assume a binary stable state corresponding to the binary signal level state at the D input to the flip-flop. Such circuits also sometimes include direct setting and resetting input connections which make it possible to force the flip-flop circuit to a particular state in the absence of the aforementioned clock signals.

A first set of the first level signals are derived from clock signals $\overline{C8}$ and $\overline{C18}$ which represent the 8.192 MHz and 18.234 MHz clock signals provided in inverted and amplified form from the IUBC, the inversion being accomplished in a group driver, e.g., 92. Two inverters 166 and 167 invert these clock signals to produce the corresponding 8M and 18M clocks. The latter clock signal is further inverted by an inverter 168 to produce a regenerated $\overline{18M}$ signal which is, in turn, delayed by coupling through a single-input NAND gate 169 and a further inverter 170 to produce a delayed 18 MHz clock designated $\overline{18MD}$.

A second set of the first level operation-determinative signals includes operation codes. The input codes from the group driver 92 include the inverted codes $\overline{01}$-$\overline{05}$ provided by the operation code deriving logic 87 in FIG. 3. The signals $\overline{01}$ through $\overline{04}$ are coupled through NOR gates 171, 172, 173, and 176 to produce the true form signals 01 through 04 which are further inverted to regenerate the complement forms by inverters 177, 178, 179, and 180. In similar fashion, the input signal $\overline{05}$ is delayed in a NAND gate 181 to produce the 05 signal which is further regenerated by an inverter 182 to produce the $\overline{05}$ signal.

Finally, the third set of control signals from the LIU group bus includes six LIU address signals SEL1-SEL6, which are not inverted and which are applied to a NAND gate 183 along with the O5 operation code signal to produce an inverted early select signal $\overline{E.SEL}$. The latter signal is regenerated by an inverter 186 to produce the E.SEL operation-determinative signal.

The second level of operation-determinative signals is derived in FIG. 6A from those first level signals just described. Thus, the $\overline{05}$, 04, and $\overline{18M}$ signals control an AND gate 187 for producing a CLEAR signal upon coincidence of those input signal conditions. The CLEAR signal is utilized along with a SERV signal (provided from an LIU state control flip-flop circuit to be described in connection with FIG. 6B) to control a NAND gate 188 which produces a 9TH BIT TIME control signal. Thus, the latter signal is produced, i.e., is low, whenever the LIU is in the service state and the CLEAR signal is being supplied to the LIU.

Similarly, a NAND gate 189 is controlled by digital input signals from the data rail (in FIG. 6B) serving this particular LIU and the operation-determinative signals $\overline{18MD}$, 01, $\overline{02}$, $\overline{03}$, and E.SEL. The gate 189, when actuated by a coincidence of high signal conditions on all six of the aforementioned inputs thereto, produces a low operation-determinative signal SET SERV. As can be seen from the character of the aforementioned input signals, the SET SERV signal appears when the LIU is selected by the address signals at the proper clock time selected by the three operation code bits and as directed by a pulse from the LIU data rail, which pulse must therefore be provided from common control by way of the switching network 22 in FIG. 1. That SET SERV signal will be utilized in FIG. 6B to control a flip-flop circuit which determines whether the LIU is in its service state or its voice only state.

A coincidence of the $\overline{01}$, $\overline{04}$, and $\overline{05}$ operation determinative signals actuates an AND gate 190 for producing an INHIBIT COUNT signal. The latter signal is employed in conjunction with the 02 and $\overline{18M}$ signals to operate a NAND gate 191 for generating a LOAD TIME signal. The latter signal is employed in conjunction with the 9TH BIT TIME signal and another signal, which is yet to be described, to control a further NAND gate 192 for producing a row 9 BIT F/F CLK signal upon a coincidence of high voltage inputs to the gate 192. The LOAD TIME signal is also coupled through an inverter 194 for producing a LOAD B. R. signal.

A further NAND gate 193 is responsive to the E.SEL signal and the operation code signals $\overline{01}$, $\overline{02}$, and $\overline{03}$ for producing an output which is coupled through an inverter 196 to provide a SEL signal which indicates that the particular LIU has been selected. The SEL signal and the 18M signal control a NAND gate 197 for producing an output which is utilized in a NAND gate 198 to provide an S.CLK signal.

The output of gate 197 and the LOAD BR signals are employed to control the stable state of a power flip-flop circuit 199 by way of a further D-type flip-flop 200. For this purpose, the LOAD BR signal is applied to clock both of flip-flops 199 and 200. Output of gate 197 controls the state of flip-flop 200, and the Q output of that flip-flop in-turn controls flip-flop 199. When the flip-flop circuit 199 is in its reset state, its high $\overline{Q}$ output is coupled through an inverter 208 for producing a signal PU. The latter signal is utilized in the LIU digital circuits in FIG. 6B, which contain a corresponding reference character within their schematic block representation, to enable the application of operating potential to such circuits only when the LIU is selected to utilize a time slot. Thus a substantial amount of electric power is conserved by not having all parts of all LIUs energized when they are only standing by for line scanning purposes.

Figure 6B:
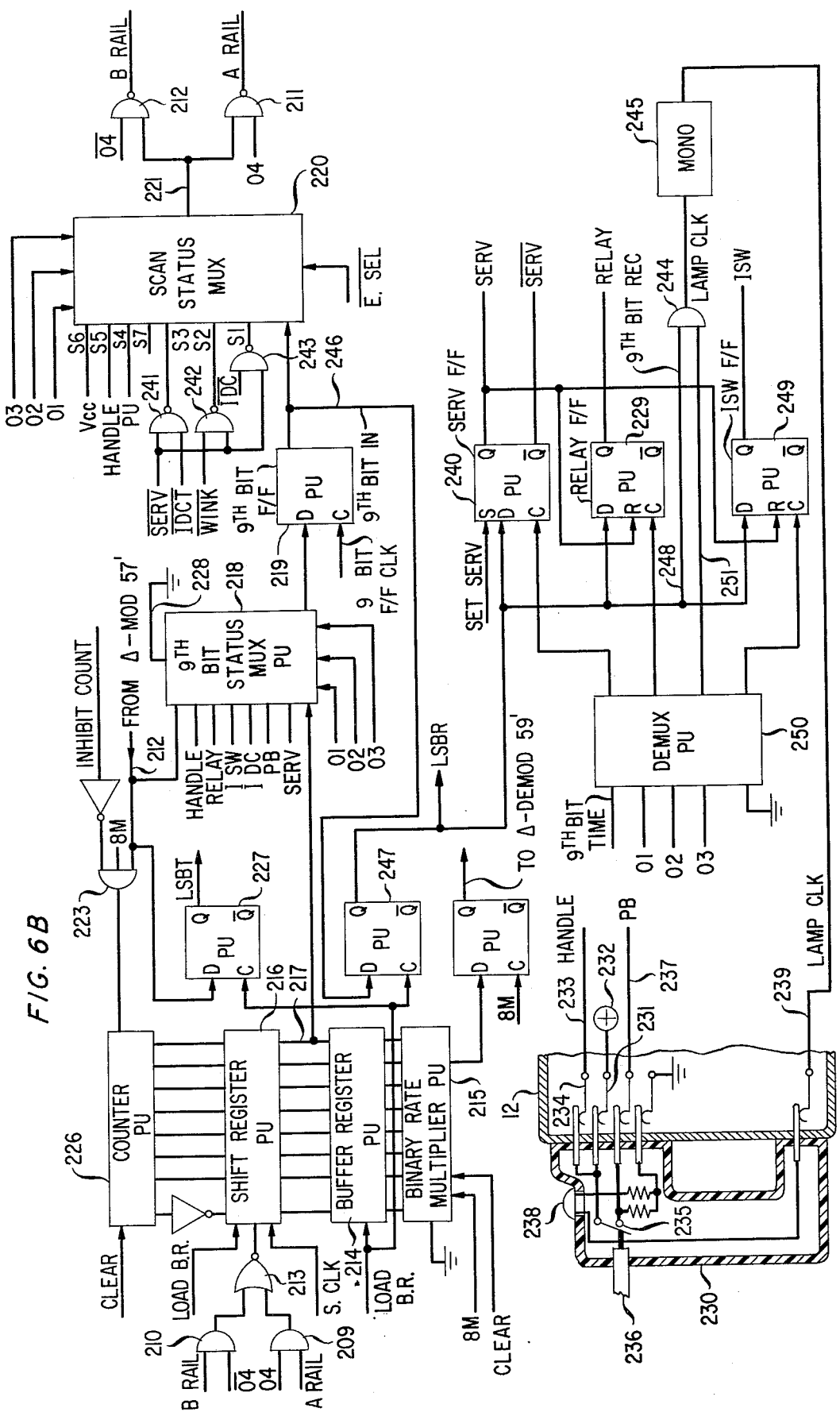

FIG. 6B includes the remaining digital portions of the LIU, and they utilize the various operation-determinative signals mentioned in connection with FIG. 6A. Digital input to the LIU is supplied from the left from the time division highway (A and B data rails) serving its IUB, as illustrated in FIG. 6B. Similarly, output from the LIU to the time division highway appears at the right-hand side of FIG. 6B. A and B data rails in that highway are indicated in this figure, and one or the other is selected by the signal 04 to select the A rail or the signal $\overline{04}$ to select the B rail. Those signals are applied to AND gates 209 and 210, respectively, for the input to the LIU, and NAND gates 211 and 212 for the output from the LIU.

Gates 209 and 210 have their outputs applied through a NOR gate 213 to the serial data input of a shift register 216 which serves both the coder and the decoder of the LIU in a manner which will be described. In that operation the shift register 216 is loaded from the coder by the LOAD B. R. control signal and thereafter operated by the S.CLK control signal for effecting shifting to the right as illustrated in the drawing. Serial output from the shift register 216 is derived on a lead 217 from the right-most stage of the shift register and coupled through a 9th bit status multiplexer 218, a 9th bit flip-flop circuit 219, and a scan status multiplexer 220, as will be subsequently described in greater detail. An output lead 221 couples the time multiplexed output of multiplexer 220 in multiple to the NAND gates 211 and 212.

Shift register 216 advantageously includes eight stages for storing eight of the bit signals of a 9-bit time slot word in the time division multiplex system here under consideration. The 9th bit is handled in a manner which will be subsequently described. Shift register 216 and associated 9th bit circuits cooperate with coder and decoder arrangements that are advantageously of the type taught in the U.S. Pat. No. 3,723,909 of J. H. Condon as previously noted. Those arrangements include, besides shift register 216 and a counter 226, a buffer register 214 and a binary rate multiplier 215. In the Condon patent, analog signals are converted to a delta modulation signal format which is further converted in a counting operation to a differential pulse code modulation (DPCM) format. Conversely, for purposes of decoding, the DPCM signals are reduced to a delta modulation type of signal format and then converted to analog form. These types of operations will be apparent in the further consideration of the modulator 57' and demodulator 59' in FIG. 5 in conjunction with the coding and decoding functions of the LIU circuits in FIG. 6B.

A delta modulation signal bit stream from the delta modulator 57' in FIG. 5 is received on a lead 212 in FIG. 6B. That signal appears whenever th LIU is in its selected, or powered-up, state. In the absence of the INHIBIT COUNT signal, the 8 MHz clock signal 8M allows the delta modulation bit stream on lead 212 to control an AND gate 223 in accordance with the presence or absence of pulses in the delta modulation signal. Output from gate 223 is applied to the counting input of a counter 226 that is periodically reset by the CLEAR signal. The entire delta modulation bit stream on lead 212 is also coupled to one input of the 9th bit status multiplexer 218, but that multiplexer is disabled as to lead 212 until the final, 9th, delta modulation bit time in certain DPCM word intervals. Just prior to this final delta modulation bit time, the LOAD B. R. control signal enters the contents of counter 226 into the shift register 216. Thereafter, the S.CLK signal shifts that count through register 216 and lead 217 to pass through multiplexer 218 to the 9th BIT F/F 219. Flip-flop circuit 219 is recurrently clocked by the 9 BIT F/F CLK signal to couple these 9 bits through the flip-flop 219 to multiplexer 220 with a one bit delay.

Different ones of the eight permutations of the operation-determinative signals 01, 02, and 03 are placed in the outputs of operation code deriving logic 87 of FIG. 3 in the different bit times of each data time slot to control multiplexer 218 of any LIU that is then used. One permutation allows 8 bits of data from lead 217 to pass through to flip-flop 219, and another allows the ninth bit from lead 212. In addition, in a selectable set of data time slots of a sample frame for an LIU, the remaining six permutations are substituted in the ninth bit time to sample the other six inputs of multiplexer 218. Scan multiplexer 220 uses the same 01–03 signals as were used by multiplexer 218, but only in scan time slots when the $\overline{E.SEL}$ signal is high. At other times the 9-bit time slot bit stream passes directly through the multiplexer 220 to lead 221.

Delta modulation signals on lead 212 are also continuously applied to a D-type flip-flop circuit 227 which is clocked only at the load time, and couples the final delta modulation bit to its output LSBT lead which extends through a resistor 164 in FIG. 5 to the feedback input of the delta modulator 57' in FIG. 6A, all in accordance with the teachings of the aforementioned Condon patent.

Both of the multiplexers 218 and 220 are advantageously the Texas Instruments 74LS151 type of multiplexer which has facilities either for causing a single input to be continuously coupled to a single output or for causing samples of plural inputs to be successively coupled to the single output. Thus, multiplexer 218 with its ground connection 228 couples to its output the single bit from the lead 212 followed by eight bits from the shift register 216. On the other hand, the multiplexer 220 couples all inputs from the flip-flop circuit 219 straight through to the output lead 221 until such time as the multiplexer is further enabled by the $\overline{E.SEL}$ operation-determinative signal, so that it then scans its various other input signal circuits in predetermined sequence. The result is that during a data time slot when the LIU is selected the contents of shift register 216 are coupled straight out to the lead 221. At times when the operation-determinative codes indicate that the 9th bit (really the first bit out of the LIU, although it is still the least significant bit) status information is to be provided, changes in the signals 01–03 substitute for the final delta modulation bit one of the other inputs of multiplexer 218. These other inputs are then taken in sequence in the assigned call time slot for the LIU in successive sample frames until such time as the complete sequence has been finished.

The aforementioned other six inputs to the 9th bit status multiplexer 218 comprise some of the scan points 67, schematically represented in FIG. 2, and include signal conditions which are respectively indicative in binary fashion of the state of different particular circuit points in the LIU. Thus, the RELAY signal indicates whether a relay flip-flop circuit 229 is in the set of reset state. The ISW signal indicates whether or not the transistor 136 in switch 66 of FIG. 5 has been operated to couple out-of-band signaling to the delta modulator 57'. An IDC signal is supplied from lead 63 in the output of the off-hook detector 62 of FIG. 5 and indicates whether or not direct current is present on the subscriber line with which the LIU is associated. This scan point signal represents an occasional snapshot of the hook detector output to facilitate LIU supervision operations in the common control.

It was previously mentioned that a handle, i.e., a maintenance handle, is available to facilitate insertion and removal of an individual LIU into an LIU frame. Such a handle 230 is illustratively indicated in FIG. 6B applied to an LIU 12. A mechanical latch, not shown, holds the handle in place until specifically removed by an attendant. In the illustrated position the handle closes a contact 231 which is otherwise open to apply the output of a potential source 232 through another contact 234 to a lead 233 as a HANDLE scan point signal. The handle also includes a pushbutton 236 that can be depressed or released by an attendant to apply a corresponding binary signal PB to a lead 237 from the source 232 by way of a pushbutton switch 235. That signal PB is another of the inputs to the 9th bit status multiplexer 218. A lamp 238 is also included in the handle 230 to advise the attendant of some communication from the common control through the network 22. The on or off condition of the lamp 238 is represented by a corresponding signal state of the LAMP CLK signal coupled to lead 239 from common control through monostable 245 which actuates the lamp 238.

The final additional input on the multiplexer 218 is the SERV input previously mentioned and which is connected to the Q-output of a service flip-flop circuit 240 to indicate the set or reset state of the flip-flop.

Apart from the calling, or data, time slot usage, as hereinbefore outlined in connection with FIG. 6B, the LIU is periodically selected to send a scan status byte in the scan time slot assigned to the IUB which includes the illustrated LIU. For that purpose the $\overline{\text{E.SEL}}$ signal goes high and enables the scan multiplexer 220 to sample its seven other inputs S1-S7 in sequence in the nine sequential bit times of the scan time slot. Six such inputs are utilized for purposes of discussion in FIG. 6B, and the other is a reserve input for indicating an additional different function as may be desired.

Input Vcc is connected to a power supply terminal, not separately shown, on the LIU plug-in frame; and that terminal is connected, when the LIU has been plugged into the LIU frame, to the office battery cable 47 to indicate the presence of one of the operating potential levels, e.g., +5 volts. Thus, the $V_{cc}$ signal advises common control whether or not the LIU has been properly plugged into its socket on the LIU frame. The HANDLE input to multiplexer 220 supplies the signal from lead 233 to indicate again, as previously described, whether or not the handle 230 is engaged with the LIU 12. A PU signal advises common control whether or not the LIU is powered up to the full extent. For example, if the PU signal were at a high logic signal level, it would indicate that the LIU was powered up; and thus it would be exchanging DPCM data on an appropriate time slot as determined by the IUBC control memory 86.

Three NAND gates 241, 242, and 243 provide inputs to multiplexer 220 which are related to the service state of the LIU. If the LIU is not in the service state, the $\overline{\text{SERV}}$ signal from the $\overline{Q}$ output of SERV flip-flop circuit 240 is in its high logic signal level, and gates 241-243 are all enabled and supply signals to multiplexer 220 in accordance with the binary states of their other input signal connections. For that purpose gate 241 receives an $\overline{\text{IDCT}}$ signal, which would appear in only an interface unit serving an office trunk, to show whether or not the IDC, i.e., the scanning signal for the truck, is in the operative or inoperative state. A $\overline{\text{WINK}}$ signal on gate 242 is coupled through time out logic, not shown, from the IDC lead to advise common control whether or not the subscriber using the LIU is operating his switchhook, after having been served, to gain attention of an operator. Finally, an $\overline{\text{IDC}}$ signal to gate 243 supplies the binary signal from lead 63 in FIG. 5 to advise common control whether or not there is direct current flowing in the subscriber line associated with the LIU. If the LIU is in the scan state, i.e., not in the service state, the $\overline{\text{SERV}}$ signal is in its low level, and the gates 241-243 are all forced to provide high level outputs to multiplexer 220 regardless of the binary signal state of their other inputs.

Returning to the codec of the LIU as partially shown in FIG. 6B, new digital signal bits from one of the data rails are coupled through NOR gate 213 into shift register 216. This input to the shaft register 216 is supplied for the usual nine bit times, but since the register includes only eight stages the first bit (LSB) passes completely through the shift register to the 9th bit status multiplexer 218 and from there to the 9th bit flip-flop circuit 219. The LOAD B.R. signal transfers the contents of the 9th bit of the shift register, i.e., flip-flop 219, into a holding register, flip-flop 247, the output of which is an LSBR signal.

The true output of flip-flop circuit 247 is the least significant bit received LSBR signal which is coupled back through a resistor 165 in FIG. 5 to an integrator input to the delta demodulator 59' in FIG. 5. The same signal, also called a 9th BIT REC signal, is further extended to the D inputs of three control flip-flops, the RELAY flip-flop 229, the SERV flip-flop 240, and an ISW flip-flop circuit 249. One of the latter three flip-flop circuits is selected at any given time by the output of a control signal demultiplexer 50 which is advantageously a Texas Instruments 74LS138 type of circuit. In that demultiplexer a 9TH BIT TIME operation-determinative signal is steered to a selectable one of the demultiplexer output leads (only four of which are shown) as directed by the binary signal state of the operation code signals 01-03. A further input to the demultiplexer is grounded in the illustrative embodiment because only four outputs need be selected for purposes of illustration. Thus, common control, when directing the control of any of the mentioned three flip-flop circuits, sends, in the 9th bit time of some selectable data time slot for the LIU, a pulse indicating the binary signal state which is sought for that flip-flop circuit. Central control must also previously have directed the IUBC of the group to put the necessary operation code permutation in the correct bit time to be available on the control inputs of the demultiplexer 50. In like manner, but without need for the LSBR signal, central control also determines the utilization of the fourth output lead 251 which is ANDed by a gate 244 with the signal on lead 248 to provide the LAMP CLK control signal to actuate a monostable multivibrator 245 for operating the lamp 238 on the maintenance handle 230.

The service state flip-flop 240 in FIG. 6B conditions the CLEAR pulse in gate 188 in FIG. 6A in order to form a negative pulse on the 9th BIT TIME signal lead if the LIU is in the service state. That pulse is the one that is distributed by demultiplexer 50 in order to clock the LSBR data into the proper control flip-flop. If the ninth bit of the data time slot in the frame specified by op code number 8 (operation-determinative signals 01-03 all low) is a ONE and the LIU is in the service state, the service flip-flop 240 will store a ONE and remain in the service state. As a result, the common control holds the LIU in the service state with a ONE in the last-mentioned ninth bit. A ZERO in that same bit time will remove the LIU from the service state by resetting flip-flop 240. However, since the 9th BIT TIME pulse is conditioned by SERV, which is the output of the SERV flip-flop, it is not possible initially to set this flip-flop via the aforementioned ninth bit. Thus the control flip-flops can never be accidentally operated by the LSB of speech. When SERV flip-flop is reset its Q output directly resets the RELAY and ISW flip-flops. In order to provide a protected entry into the service state, the common control must initiate service through its scanning mechanism. Because the network is a 4-wire network in that a path from an LIU to the common control has a corresponding path from the common control to the LIU, the scanner reverse channel is advantageously used as an additional way for the common control to communicate with the LIU. By sending a ONE in the first bit of the scanning time-slot in the frame assigned for scanning a particular LIU, the gate 189 is caused to generate the SET SERV signal that is applied to flip-flop 240 and thereby places the LIU in the service state.

It can now be seen that by telemetering low frequency signals around the LIU hybrid at selectable times, various functions otherwise requiring separate circuitry can be performed by common time shared equipment interconnected through the call switching network. This reduces the need for office wiring as well as facilitating office growth by adding LIUs as needed instead of adding entire call connecting and processing modules that may be largely unused when first added. Since the multiplexing of the low frequencies is needed only relatively infrequently, the LIU multiplexing facilities employed for monitoring and controlling that usage are also used advantageously for other service observing and controlling purposes to improve system maintenance and flexibility.

Although the invention has been described in connection with a particular embodiment thereof, it is to be understood that additional embodiments, and modifications thereof which will be obvious to those skilled in the art are included within the spirit and scope of the invention.

What is claimed is:

1. In a telephone communication system, a line unit for interfacing a subscriber's analog line circuit with a digital call switching office, said line unit comprising
means for encoding analog signals in digital form for use in said office,
first means for coupling only alternating current signals between said line circuit and an input of said encoding means, said coupling means presenting a predetermined impedance to a first frequency range of signals and a much higher impedance to direct current and to alternating current signals of frequencies in a second range below said first range,
means, responsive to direct current and to signals in at least said second range, for sensing net line signal current on the line circuit side of said coupling means, and
second means, responsive to an output of said sensing means and selectively actuatable, for coupling signals representing said direct current and said alternating current signals in said second range to said input of said encoding means for encoding such coupled signals.

2. The communication system in accordance with claim 1 in which said sensing means output coupling means comprises,
means for passing out-of-band signaling in said low frequency range with an essentially flat response versus frequency characteristic, and
means for passing higher frequencies than said out-of-band signaling, and including at least a predetermined frequency in the low-frequency portion of said predetermined frequency range, with a predetermined increasing attenuation characteristic with respect to frequency as compared to said out-of-band signals.

3. The communication system in accordance with claim 1 in which said line unit further comprises
a plurality of electric circuit control points, each of which provides an operational signal for said line unit, and which points are electrically remotely controllable for initiating or terminating that operational signal,
means for demultiplexing from said digital input port both input signals for said analog signal port and signals for operating said control points selectively, and
means for coupling demultiplexed control point operating signals to said control points, respectively.

4. The communication system in accordance with claim 1 in which
said line unit further comprises a plurality of electric circuit scan points at which signals appear indicating, in a binary signal state sense, the condition of respective predetermined line unit functions other than line circuit signal level, and
said encoding output coupling means includes means for multiplexing to a path to said office said digital form of signals from said encoding means and said scan point signals.

5. The communication system in accordance with claim 4 which said line unit further comprises,
means for applying an electric signal to actuate said second coupling means, and
said applying means including at least one of said scan points for indicating whether or not said separate coupling means is actuated.

6. The communication system in accordance with claim 1 which further includes
multiport means in said office for controllably switching communications among respective ports thereof, a plurality of said line units, each coupled to a different one of said switching means ports, means coupled to a port of said switching means for digitally filtering signals from such port to detect predetermined different characteristics of such signals at different times, and means for controlling said network to interconnect a line unit and said digital filtering means and to actuate said second coupling means of such line unit for operation at the same time.

7. The communication system in accordance with claim 1 in which a digital-to-analog decoder is provided in said line unit and said first coupling means comprises a hybrid transformer having a 2-wire port connected to said analog line circuit and a 4-wire port for coupling signals from said transformer 2-wire port to an input of said encoding means and for coupling signals from an output of said decoder to said transformer 2-wire port.

8. The communication system in accordance with claim 1 in which said second coupling means comprises, means for sensing net current at said analog signal port, frequencies of said low frequency signals include frequencies used in said system for out-of-band signaling, means for low-pass filtering the output of said sensing means with a cutoff frequency above said signaling frequencies.

9. The communication system in accordance with claim 8 which means are provided for multiplexing different signals from said line unit to a path to said office, means are provided for coupling said coder output to a first input of said multiplexing means, and said second coupling means further comprises, first means for applying an output of said filtering means to said input of said encoding means in selectable time intervals, and second means for applying said output of said filtering means to a second input of said multiplexing means without passing through said encoding means.

10. The communication system in accordance with claim 1 in which said first coupling means comprises, a hybrid transformer having a 2-wire port and a 4-wire port, means for applying direct current through a part of said hybrid to terminals of said transformer 2-wire port, means for applying ringing signals to said line unit, and means for selectably connecting said line unit analog signal port either to said transformer 2-wire port or to said applying means.

11. The communication system in accordance with claim 10 in which said second coupling means comprises, means, connected between said analog line circuit and said selectable connecting means, for sensing net line signal current at said analog line circuit, and means for coupling an output of said sensing means to said encoding means.

12. The communication system in accordance with claim 1 in which means are provided for operating said encoding means at a predetermined sampling rate, and said first coupling means includes low-pass filter means connected for coupling between said analog live circuit and said encoding means, said low-pass filter means having a cutoff frequency substantially above the upper frequency of said analog line circuit signals but at a frequency which is below said sampling rate.

13. The communication system in accordance with claim 1 in which, means are provided for decoding digital signals from said switching office to analog form, low-pass filter means are connected to an output of said decoding means and have a cutoff frequency which is substantially above the frequencies of said analog signals but below decoding sideband frequencies around the sampling frequency of said decoding means, and said first coupling means includes means for coupling an output of said low-pass filter means to said analog line circuit.

14. The system in accordance with claim 1 in which said line unit further comprises means in said second coupling means for controllably disabling and enabling such coupling means, an input digital signal port for receiving digital signals from said office, means for decoding digital signals to corresponding analog format, and means for demultiplexing signals at said input port to direct predetermined different portions thereof to said analog line circuit by way of said decoding means and a part of said first coupling means and to said enabling and disabling means, respectively.

15. The system in accordance with claim 1 in which said line unit further comprises means for receiving ringing signals from said office, third means for controllably coupling said line circuit to said first coupling means or to said receiving means, an input digital signal port for receiving digital signals from said office, means for decoding digital signals to corresponding analog format for coupling through a part of said first coupling means to said analog line circuit, and means for demultiplexing signals at said input port to direct predetermined different portions thereof to said decoding means and to said third coupling means, respectively.

16. The system in accordance with claim 1 in which said line unit further comprises means for controllably producing a visual signal for alerting an attendant, an input digital signal port for receiving digital signals from said office, means for decoding digital signals to corresponding analog format for coupling through a part of said first coupling means to said analog line circuit, and means for demultiplexing signals at said input port to direct predetermined different portions thereof to said decoding means and to said producing means, respectively.

17. The communication system in accordance with claim 1 in which means are provided for operating said encoding means at a predetermined sampling rate to produce output pulse coded words at a predetermined word rate, and said first coupling means includes low-pass filter means connected for coupling between said analog line circuit and said encoding means, said low-pass filter means having a cutoff frequency substantially above the upper frequency of said analog line circuit signals but at a frequency such that the difference between said word rate and said cutoff frequency is much closer in frequency to said word rate than to said cutoff frequency.

18. The communication system in accordance with claim 1 in which said sensing means comprises means, responsive to current in said analog line circuit and presenting such a low impedance thereto as to extract substantially negligible energy from said line circuit, for producing in said second coupling means an output signal proportional to said line circuit current.

19. The communication system in accordance with claim 1 in which said line circuit is a two-wire circuit, and said sensing means comprises, first and second switchable saturable magnetic cores, means for coupling each of said cores in the same sense to one wire of said line circuit, means for coupling each of said cores in the same sense to another wire of said line circuit, and the sense of linking to the latter wire being in aiding relationship to the sense of linking to said one wire with respect to magnetic flux induced in said cores by a current circulating in both wires of said line circuit, and means for interrogating said cores to determine the magnetic state thereof, said interrogating means including means for producing an analog output signal having a magnitude which is proportional to the net circulating current in said wires of said line circuit.

20. In a telephone communication system, a line unit comprising a bidirectional 2-wire analog signal port, a 2-wire, digital signal, input port and a 2-wire, digital signal, output port, means for encoding analog signals in digital form, means for coupling an output of said encoding means to said output port, means for coupling only alternating current signals in a predetermined frequency range from said bidirectional port to an input of said encoding means, means for separately coupling to said encoding means input at selectable times low-frequency signals in a range extending in frequency from direct current through only a low-frequency portion of said predetermined frequency range inclusively, said line unit further comprising a plurality of electric circuit scan points at which signals appear indicating, in a binary signal state sense, the conditions of respective predetermined line unit functions other than analog port signal level, said encoding output coupling means includes means for multiplexing to said output port said digital form of signals from said encoding means and said scan point signals, and said line unit is a plug-in unit in which there is provided a removable handle electrically engaging said unit and said handle comprises means for producing a signal indicating whether or not said handle is in engagement with said interface unit, means for producing a visual signal, means manually operable for producing signals, and means for coupling signals from each of said signal producing means to different ones of said electric circuit scanning points.

21. In a telephone communication system, a line unit comprising a bidirectional, 2-wire, analog signal port, a 2-wire, digital signal, input port and a 2-wire, digital signal, output port, means for encoding analog signals in digital form, means for coupling an output of said encoding means to said output port, means for coupling only alternating current signals in a predetermined frequency range from said bidirectional port to an input of said encoding means, and means for separately coupling to said encoding means input at selectable times low-frequency signals in a range extending in frequency from direct current through only a low-frequency portion of said predetermined frequency range inclusively, said low-frequency signals including frequencies used in said system for out-of-band signaling, said separate coupling means including means for sensing net current at said analog signal port, means for low-pass filtering the output of said sensing means with a cutoff frequency above said signaling frequencies, first means for applying an output of said filtering means to said input of said encoding means in selectable time intervals, and second means for applying said output of said filtering means to said output port without passing through said encoding means, said second output applying means including, a low-pass filter having a cutoff frequency at a fraction of a 1 Hz for passing direct current but blocking low-frequency line hit signals, and a trigger circuit for producing either a first or a second binary signal state in response to predetermined different output level ranges from said low-pass filter.

22. In a telephone communication system a line unit comprising a bidirectional, 2-wire, analog signal port, a 2-wire, digital signal, input port and a 2-wire, digital signal, output port, means for encoding analog signals in digital form, means for coupling an output of said encoding means to said output port, means for coupling only alternating current signals in a predetermined frequency range from said bidirectional port to an input of said encoding means, and means for separately coupling to said encoding means input at selectable times low-frequency signals in a range extending in frequency from direct current through only a low-frequency portion of said predetermined frequency range inclusively, said separate coupling means comprising means for sensing net current at said analog signal port, said sensing means comprising first and second switchable saturable magnetic cores, means for coupling each of said cores in the same sense to one wire of said 2-wire port, means for coupling each of said cores in the same sense to another wire of said 2-wire port, and the sense of linking to the latter wire being in aiding relationship to the sense of linking to said one wire with respect to magnetic flux induced in said cores by a current circulating in both wires of said 2-wire port, and means for interrogating said cores to determine the magnetic state thereof, said interrogating means including means for producing an analog output signal having a magnitude which is proportional to the net circulating current in said wires of said 2-wire port, frequencies of said low-frequency signals including frequencies used in said system for out-of-band signaling, and means for low-pass filtering the output of said sense means with a cutoff frequency above said signaling frequencies.

23. In communication system in accordance with claim 22 in which said sensing means further comprises, a single electric circuit loop coupled to both of said cores in senses such that an electric current in said loop affects both of said cores in the same sense, and said loop being dimensioned for reducing series inductance in said 2-wire analog port linkages with such cores.

24. In a telephone communication system, a line unit comprising a bidirectional, 2-wire, analog signal port, a 2-wire, digital signal, input port and a 2-wire, digital signal, output port, means for encoding analog signals in digital form, said encoding means including means for converting analog signals to corresponding digital signals and means connected to an output of said converting means for registering said digital signals, a digital-to-analog converter including means for registering digital signals, a shift register, means for coupling the output of said encoding registration means to said shift register in a first time interval, means for coupling the contents of said shift register to the input registration means of said decoder in a second time interval, means for shifting digital signals into one end of said shift register from said 2-wire digital input port and out of the other end of said shift register to said 2-wire digital output port at the same time, means for coupling only alternating current signals in a predetermined frequency range from said bidirectional port to an input of said encoding means, and means for separately coupling to said encoding means input at selectable times low-frequency signals in a range extending in frequency from direct current through only a low-frequency portion of said predetermined frequency range inclusively.

25. The communication system in accordance with claim 24 in which the line unit has plural functions to be status scanned, a first group of such functions to be scanned at a predetermined status rate and a second group of said functions to be scanned at a different service rate, and said line unit further comprises means for multiplexing signals representing said first group of functions to said output port with said signals from said other end of said shift register, and means for multiplexing signals representing said second group of functions to said output port with the least significant bit position of said encoding means output registration means.

26. The communication system in accordance with claim 24 which further comprises in said line unit, plural means, controllable by signals from said shift register, for performing a plurality of circuit functions, means for demultiplexing signals from predetermined time intervals of signals at an input of said decoder, and said demultiplexing means including means for distributing said predetermined time interval signals to actuate different ones of said performing means.

27. A line interface unit for a switchable electric signal line interconnection system, each signal line having one such unit comprising, means for converting analog signals to corresponding digital representations, an output digital circuit, plural electric circuit scan points at which there are produced signals indicative of plural predetermined functions of said unit other than the net signal level of a line to which said unit is connected, and means for time multiplexing, into discrete time intervals on said digital circuit, electric signals from an output of said converting means with signals at said scan points.

28. A time division multiplex digital communication system operable in accordance with a predetermined time base for selectably interconnecting any calling subscriber circuit with any other called subscriber circuit by way of a time division multiplex switching network, said system comprising means for interfacing each of said subscriber circuits with said network, said interfacing means for each of said subscriber circuits including, a bidirectional analog signal port, a digital input port and a digital output port, means for encoding analog signals in digital form, means for coupling an output of said encoding means to said output port, means for coupling alternating current analog signals in a predetermined frequency range from said bidirectional port to an input of said encoding means, and means for separately coupling to said encoding means input at selectable time low-frequency signals in a range extending in frequency from direct current through the low-frequency portion of said predetermined frequency range inclusively.

29. The communication system in accordance with claim 28 in which, said interfacing means for respective ones of said subscriber circuits are arranged in different interfacing means groups, a plurality of time division multiplex highways are provided each having one end coupled to interface means digital ports of a different one of said groups and having the other end thereof coupled to a different port of said switching network, and each of said interfacing means further includes means, including said separate coupling means, for coupling a direct current level indicating signal from said bidirectional signal port to said output port, and said coder output coupling means includes means for multiplexing onto the time division highway for the group in which such interfacing means is included at least said level indicating signal and an output from said encoding means.

30. The communication system in accordance with claim 29 in which each of said interfacing means is a separate plug-in unit and an interfacing unit frame is provided for receiving said plug-in units and supplying operating potential thereto, means are provided for indicating whether or not said plug-in unit is fully operatively associated with said interface unit frame, and said multiplexing means includes means for multiplexing onto the time division highway for the group in which such interfacing means is included the output of said indicating means.

31. The communication system in accordance with each of said interfacing means includes means for producing a visual signal, said producing means includes at least one signal scan point for indicating the state of said visual signal, and said multiplexing means includes means for also multiplexing signals from the last-mentioned scan point onto said time division highway.

32. The communication system in accordance with claim 28 in which there are provided an operating potential bus and a clock signal bus, said interfacing means are arranged into a plurality of blocks of such means and each such block is subdivided into a plurality of groups of said interfacing means, and means are provided for controlling each of said blocks of interfacing means, each such controlling means having means for supplying clock signals from said clock bus to said interfacing means of said block, control memory means for storing signals for indicating which of said interfacing means of such block should be operated at any given time, means for coupling said control memory signals to said interfacing means, and means for coupling signals from predetermined time slot intervals on said time division highway serving such block to control contents of said control memory means.

33. The communication system in accordance with claim 32 in which, means are provided in said block controlling means, and responsive to said clock signals, for supplying to all interfacing means of a block of said interfacing means a recurrent sequence of operation code signals for recurrently enabling predetermined interfacing means functions.

34. The communication system in accordance with claim 32 in which there are provided means, in each of said interfacing means and separately controllable, for applying operating potential to first and second parts of such means, and said separately controllable applying means includes means for so applying operating potential to said second part only when actuated by signals from said control memory means, said first part having operating potential applied thereto at all times during operation of said communication system.

* * * * *

UNITED STATES PATENT AND TRADEMARK OFFICE
CERTIFICATE OF CORRECTION

PATENT NO. : 4,007,334
DATED : February 8, 1977
INVENTOR(S) : Henry S. McDonald

It is certified that error appears in the above-identified patent and that said Letters Patent are hereby corrected as shown below:

Column 1, line 33, "Proceeding" should read --Proceedings--. Column 2, line 33, "line circuicentral-office" should read --line-circuit-central-office--; line 38, "as" should read --an--. Column 3, line 61, "hydride" should read --hybrid--. Column 4, line 56, "arrange" should read --arranges--. Column 6, line 56, "which" should read --what--. Column 7, line 30, "has" should read --was--. Column 14, line 13, after "the" insert --other--; line 64, "alisasing" should read --aliasing--. Column 20, line 16, "truck" should read --trunk--; line 34, "shaft" should read --shift--. Column 23, line 49, "first" should read --alternating current--. Column 28, line 62, "time" should read --times--. Column 29, line 34, after "with" insert --claim 29 in which--.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks